United States Patent
Edwards et al.

(10) Patent No.: US 6,724,305 B2
(45) Date of Patent: Apr. 20, 2004

(54) PULSE INDUCTION SILVERWARE DETECTOR

(75) Inventors: Richard E. Edwards, Long Beach, CA (US); Brad Peeters, Costa Mesa, CA (US)

(73) Assignee: Golden West Sales, Huntington Beach, CA (US)

( * ) Notice: Subject to any disclaimer, the term of this patent is extended or adjusted under 35 U.S.C. 154(b) by 0 days.

(21) Appl. No.: 09/865,387

(22) Filed: May 25, 2001

(65) Prior Publication Data

US 2002/0175817 A1 Nov. 28, 2002

(51) Int. Cl.$^7$ ................................................ G08B 13/14
(52) U.S. Cl. ................... 340/568.1; 340/551; 209/570; 209/926
(58) Field of Search ............................. 340/551, 552, 340/568.1, 571; 209/567, 570, 903, 926; 310/10; 336/65; 361/679, 600; 324/329, 233, 328, 239, 326, 327

(56) References Cited

U.S. PATENT DOCUMENTS

| | | | |
|---|---|---|---|
| 1,138,889 A | 5/1915 | Rand | 209/231 |
| 1,930,108 A | 10/1933 | Reeder | 209/228 |
| 2,587,158 A | 2/1952 | Hofberg | 209/573 |
| 2,698,450 A | 1/1955 | Mack | 15/257.06 |
| 2,869,795 A | 1/1959 | Higer | 241/81 |
| 3,157,904 A | 11/1964 | Flodell | 209/355 |
| 3,283,899 A | 11/1966 | Vedvik et al. | 209/549 |
| 3,301,397 A | 1/1967 | Stutz | 209/542 |
| 3,394,806 A | 7/1968 | Vaillette | 209/590 |
| 3,599,788 A | 8/1971 | Fyle et al. | 209/11 |
| 3,877,577 A | 4/1975 | Richard | 209/679 |
| 3,938,533 A | 2/1976 | Richard | 134/63 |
| 4,049,544 A | 9/1977 | Turner | 209/45 |
| 4,171,262 A | 10/1979 | Lattmann et al. | 209/555 |

(List continued on next page.)

FOREIGN PATENT DOCUMENTS

| | | |
|---|---|---|
| DE | 25 47 474 | 5/1977 |
| DE | 26 10 272 | 9/1977 |
| DE | 29 44 192 | 5/1981 |
| DE | 32 03 533 | 11/1982 |
| FR | 2385451 | 3/1977 |

OTHER PUBLICATIONS

KatchAll Industries Midwest Inc.; "KatchAll Products Reduce Food–service Overhead, Repairs"; 2 pages; 1986.
Dripcut Corporation; "Magnetic Products"; 1 page.

Primary Examiner—Benjamin C. Lee
(74) Attorney, Agent, or Firm—Stetina Brunda Garred & Brucker

(57) ABSTRACT

There is provided a receptacle system for detecting at least one metallic object entering therein and alerting a user in response to the detection. The system of the preferred embodiment comprises a receptacle body forming an interior cavity. Moreover, a cover may be engaged to the receptacle body, in which the cover may define an opening for providing access to the interior cavity. A metal detector may be attached to the cover to detect the at least one metallic object entering through the opening of the cover. Thereafter, the metal detector may alert the user in response to the detection of the at least one metallic object.

19 Claims, 9 Drawing Sheets

U.S. PATENT DOCUMENTS

| | | | | |
|---|---|---|---|---|
| 4,203,537 A | | 5/1980 | McAllister | 222/570 |
| 4,279,744 A | | 7/1981 | Antonwitsch | 209/214 |
| 4,367,138 A | | 1/1983 | Kustas | 209/224 |
| 4,480,753 A | | 11/1984 | Thomas et al. | 209/546 |
| 4,485,927 A | | 12/1984 | Corsmeier, Jr. | 209/621 |
| 4,494,657 A | | 1/1985 | Oldenkamp | 209/636 |
| 4,541,530 A | | 9/1985 | Kenny et al. | 209/571 |
| 4,632,253 A | | 12/1986 | Stromgren et al. | 209/570 |
| 4,675,658 A | * | 6/1987 | Anderson et al. | 340/551 |
| 4,685,569 A | | 8/1987 | Osaki et al. | 209/571 |
| 4,706,818 A | | 11/1987 | Zutell et al. | 209/636 |
| 4,718,559 A | | 1/1988 | Kenny et al. | 209/571 |
| 4,742,339 A | * | 5/1988 | Baziuk | 340/568.1 |
| 4,782,970 A | | 11/1988 | Edwards | 209/636 |
| 4,868,910 A | * | 9/1989 | Maulding | 324/233 |
| 5,001,425 A | * | 3/1991 | Beling et al. | 324/239 |
| D331,133 S | | 11/1992 | Edwards | D34/11 |
| 5,414,411 A | * | 5/1995 | Lahr | 340/551 |
| 5,538,143 A | | 7/1996 | Pettersson | 209/698 |
| 5,576,621 A | * | 11/1996 | Clements | 324/239 |
| 5,596,277 A | * | 1/1997 | Rowan | 324/329 |
| 5,767,740 A | * | 6/1998 | Fogg | 330/10 |
| 5,797,497 A | | 8/1998 | Edwards | 209/570 |
| 5,815,581 A | * | 9/1998 | Andersson | 381/68.4 |
| 6,129,213 A | | 10/2000 | Edwards | 209/214 |
| 6,222,450 B1 | * | 4/2001 | Clements | 340/568.1 |

* cited by examiner

| FIG. 4A | FIG. 4B | FIG. 4C |

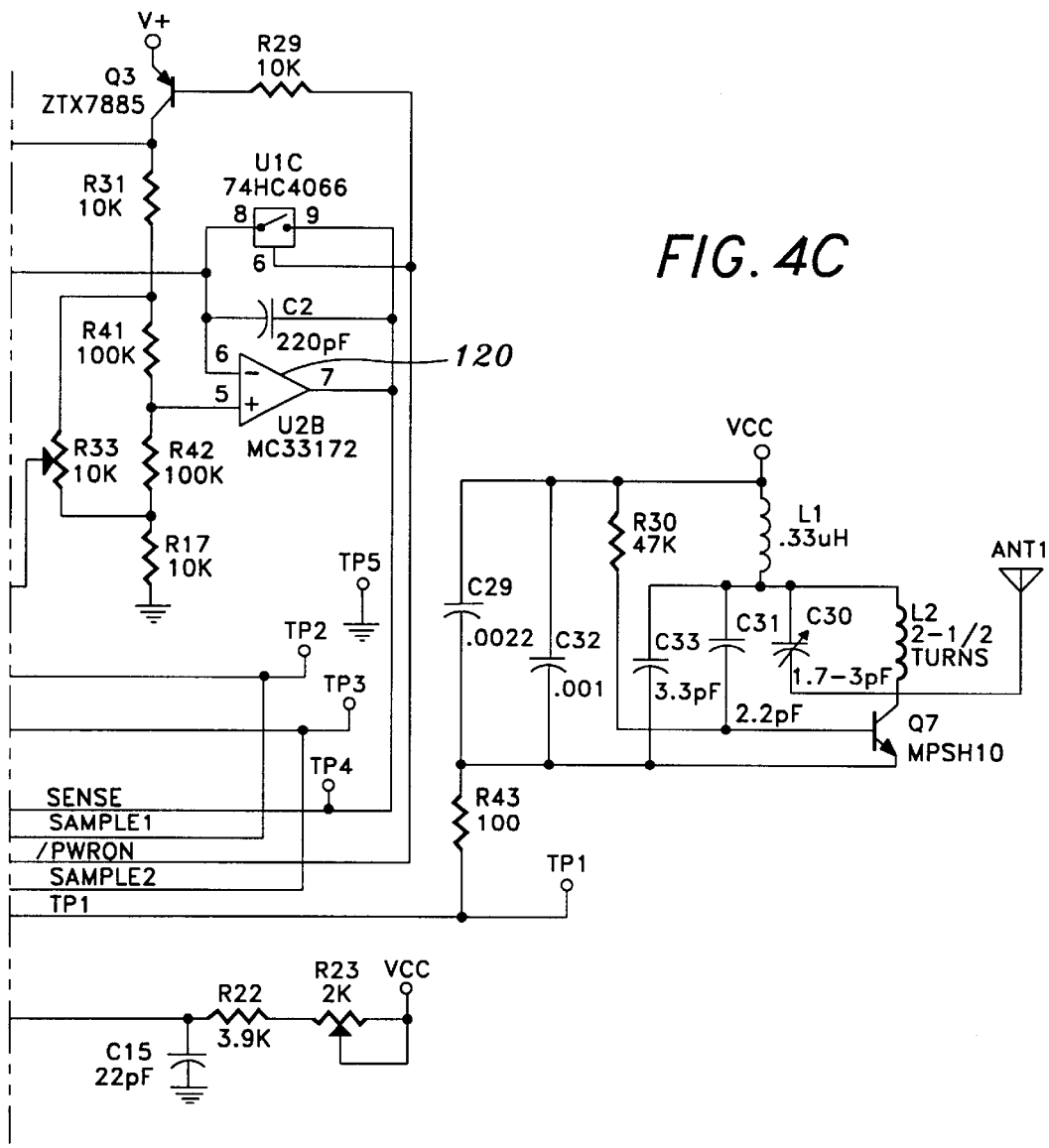
FIG. 4C
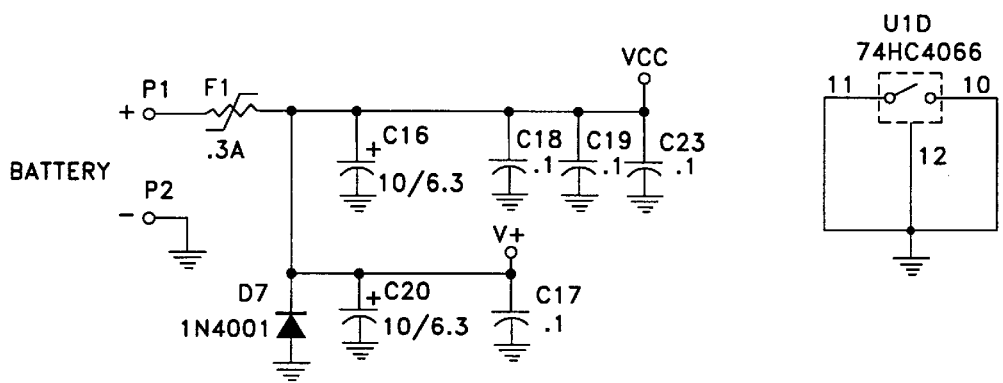

PULSE INDUCTION SILVERWARE DETECTOR

CROSS-REFERENCE TO RELATED APPLICATIONS (Not Applicable)

STATEMENTS RE: FEDERALLY SPONSORED RESEARCH/DEVELOPMENT (Not Applicable)

BACKGROUND OF THE INVENTION

The present invention generally relates to a method and an apparatus for detecting metallic objects, and more particularly to an improved method and apparatus for selectively detecting metallic silverware that is intermingled among excess food fragments entering into a receptacle system via a metal detector attached thereto.

The loss of silverware in the food industry has been a consistent and menacing problem throughout the years. With each loss of the silverware, the costs associated with restaurants' general overhead are inevitably increased. More specifically, restaurants have no other alternatives but to replace the lost silverware since they are vital tools utilized in the business. Depending upon the types of silverware (e.g., forks, spoons, knives, tongs, or the like), the costs for replacing them may be substantial.

The loss of few silverware may not pose to be a serious financial detriment. However, a perpetual loss of the silverware, even few at a time, may become a significant financial concern in which many restaurants cannot ignore. No matter what social classification a particular restaurant belongs to, the loss of silverware may be a burden that all restaurants have in common.

For instance, higher-end restaurants generally use expensive silverware in order to correspond to their upscale image. As such, a loss of even a few may prove to be costly, and such cost may enhance significantly when the loss of silverware becomes perpetual. Even the so-called lower-end restaurants cannot escape the financial burden caused by the loss of their silverware. Although their silverware may not be as expensive as that of the higher-end restaurant's, the price of replacing them may pose to be a financial concern in view of their general overhead costs. Simply put, many restaurants cannot escape the financial burden caused by the loss of the silverware.

More particularly, the loss of silverware mainly occurs when they are being washed and cleaned. In such situations, food remnants remaining on dirty plates must be disposed of before the plates are washed. Oftentimes, as the silverware are intermingled with the excess food remnants, they may be accidently dropped into a trash receptacle while in the process of dumping the food remnants.

Given the volume of dishes and silverware that typically need to be washed in restaurants, such inadvertent mistakes may go unnoticed. The loss of silverware in the above-described manner may occur frequently, especially during times when restaurants are at their busiest. A need to wash them rapidly in order to meet the flocking customers may further contribute to the problem.

An attempt has been made to address the problem of losing silverware. More specifically, there exists a cover-like device fabricated to be sized and configured to fit over a trash bin. Such device is usually made from plastic material. The cover-like device comprises an angled chute for receiving the excess food fragments therethrough. In other words, restaurant employees would simply dump the excess food fragments from the dirty plates into the angled chute. The cover-like device further includes large powerful permanent magnets that are strategically positioned under the chute. Therefore, large magnets capture any silverware that are accidently dumped into the chute so as to permit only the food fragments to be disposed into the trash bin. Thus, the cover-like device were helpful in partially alleviating the loss of silverware.

However, such prior art device had its limitations. Due to the inherent nature and composition of the magnets, the device only worked with the silverware composed of ferrous metallic materials. As is generally known, ferrous metallic materials are subject to magnetic attraction. In this regard, the magnets of the cover-like device were inoperative when the silverware made of non-ferrous metallic materials was introduced into the angled chute.

Such limitation is a major drawback in preventing the loss of silverware, especially in view of today's society where the non-ferrous metallic silverware is more abundant than ever. As such, the prior art device puts a significant negative impact upon the purpose that it was originally designed for.

Thus, there has long been a need in the industry, and in the food industry in particular, for a method and an apparatus for mitigating the loss of silverware. In particular, there is a need for an invention that would overcome the deficiency of the prior art device and prevent the inadvertent loss of both ferrous and non-ferrous metallic silverware to the greatest extent possible.

The present invention addresses and overcomes the above-described deficiency of the prior art device by providing a method and apparatus for selectively detecting metallic silverware that is intermingled among excess food fragments entering into a receptacle system via a metal detector attached thereto. More specifically, the metal detector generates a sound tone to alert a user in response to the detection of the silverware within its proximity. In addition, the metal detector is further configured to detect the presence of the metallic silverware composed of either a ferrous metallic material or a non-ferrous metallic material. In this respect, not only does the present invention mitigate the problems of the prior art device, but it also maximizes the purpose that it was designed for.

BRIEF SUMMARY OF THE INVENTION

In accordance with a preferred embodiment of the present invention, there is provided a receptacle system for detecting at least one metallic object entering therein and alerting a user in response to the detection. The system of the preferred embodiment comprises a receptacle body forming an interior cavity. Moreover, a cover may be engaged to the receptacle body, in which the cover may define an opening for providing access to the interior cavity. A metal detector may be attached to the cover to detect the at least one metallic object entering through the opening of the cover. Thereafter, the metal detector may alert the user in response to the detection of the at least one metallic object.

The receptacle body may be fabricated from a plastic or a metallic material, whereas the metal detector and cover may be fabricated from a plastic material. The cover of the preferred embodiment has an inside surface. The inside surface may removably attach the metal detector. The cover may also form a chute. In addition, the cover may be removably engaged to the receptacle body.

In accordance with a preferred embodiment of the present invention, the at least one metallic object may be a type of silverware. The at least one metallic object may be fabricated either from a ferrous or a non-ferrous material. Moreover, the metal detector may further comprise a battery compartment which may be sized and configured to receive at least one battery therein for the purpose of generating power to the metal detector.

In the preferred embodiment, the metal detector may be a pulse induction metal detector capable of generating a series of pulses. Such metal detector may comprise at least one search coil that is receptive of the series of pulses. The at least one search coil may further output a signal in response thereto. The metal detector may further comprise a low pass filter that is receptive of the signal from the at least one search coil to mitigate outside interferences therefrom. In addition, there may be a front-end amplifier circuit for amplifying the signal. The metal detector may further comprise a microcontroller for performing a first sampling and a second sampling upon the signal for the ultimate purpose of generating a sound tone when a programmed threshold is exceeded thereby.

More specifically, the metal detector preferably comprises two search coils so as to be optimal in the environment such as a commercial kitchen, which is filled with horrendously noisy magnetic fields. The output from these coils is connected to the front-end amplifier circuit differentially so that interferences from external, relatively distant magnetic sources would be presented to the front-end amplifier as a common mode signal and thus be rejected. The two search coils are placed side by side so that at least one metallic object falling past them first enters the proximity of one such coil then the other. In this way, since only one coil is encountered at a time, a signal is induced that is not rejected by the differential connection.

In particular, the series of pulses may be communicated to the at least one search coil for approximately 20 microseconds. The search coil may be formed on a printed circuit board, such as a 0.062 inch FR4 circuit board. The series of pulses rapidly terminate to induce a series of eddy currents into the at least one metallic object, if there is/are any, to determine the detection thereof. Moreover, the at least one search coil may be a spiral search coil. The at least one search coil may output the signal after the eddy currents are induced into the at least one metallic object, if any, such that the signal may contain information obtained thereby as to the detection of the at least one metallic object.

Furthermore, the front-end amplifier circuit may be selectively operative only when amplifying the signal to mitigate any unnecessary power consumption. Moreover, the microcontroller may utilize a RC relaxation oscillator and crystal oscillator for regulating precision of high and low speed timing of the metal detector. The microcontroller may further be adapted to alternate between operative and inoperative modes to mitigate any unnecessary power consumption.

In the preferred embodiment, the first sampling and the second sampling may each be performed for approximately 50 microseconds. The metal detector may comprise a differential integrator circuit that is operative to apply complementary inputs to the first sampling and the second sampling. More specifically, the differential integrator compares the first sampling and the second sampling. The microcontroller then uses its analog to digital converter (ADC) to capture the result at the output of the integrator. The microcontroller may be in communication with a speaker for generating the sound tone when the measurements of the first sampling and the second sampling exceed a programmed threshold. A full H-bridge designed circuit may be utilized to drive the speaker. The microcontroller may also be in communication with an RF transmitter for the purpose of triggering a remote sound-generating device. Such communication with the RF transmitter may be needed at times as the speaker built into the metal-detector itself is muffled by the contents of the trash bin, making it hard to hear in the noisy environment of a commercial kitchen, for example.

In accordance with a preferred embodiment of the present invention, the receptacle system further comprises a method of detecting a metallic object entering therein via a metal detector. The preferred embodiment may comprise the method of attaching the metal detector to an inside surface of a cover. Then, disposing the metallic object into an opening of the cover which provides access to an interior cavity of a receptacle body.

The method may further comprise detecting the metallic object with the metal detector as the metallic object progresses to the interior cavity. Next, generating a sound tone to indicate the detection of the metallic object. Finally, retrieving the metallic object from the interior cavity in response to the sound tone.

BRIEF DESCRIPTION OF THE DRAWINGS

These as well as other features of the present invention, will become more apparent upon reference to the drawings wherein.

DETAILED DESCRIPTION OF THE INVENTION

Figure 1:
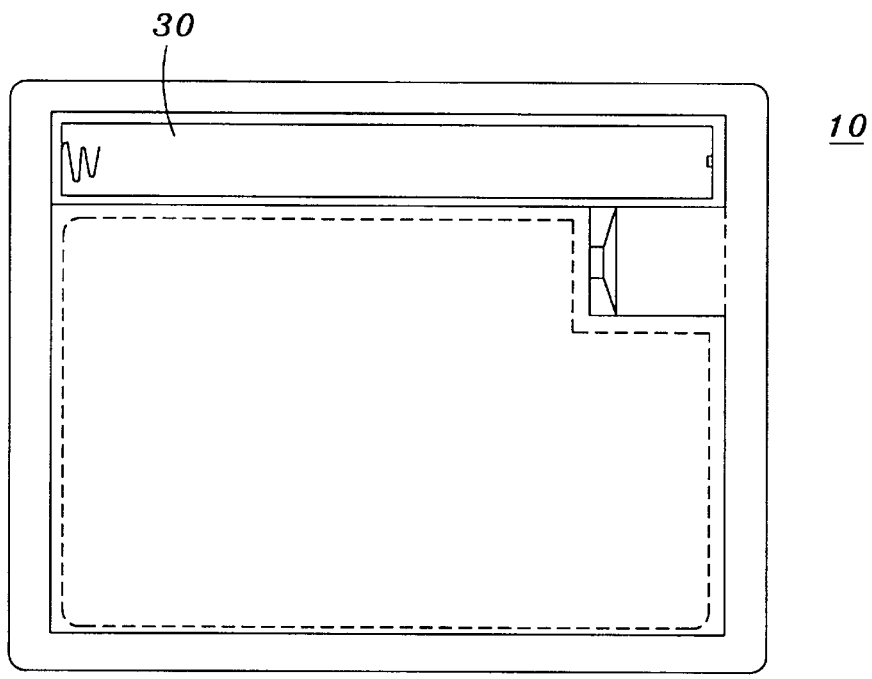
FIG. 1 is a plan view of a metal detector constructed in accordance with a preferred embodiment of the present invention and defining a battery compartment.

Referring now to the drawings wherein the showings are for purposes of illustrating preferred embodiments of the present invention only, and not for purposes of limiting the same, FIG. 1 is a plan view of a metal detector 10 constructed in accordance with a preferred embodiment of the present invention. The metal detector 10 is adapted to engage within a trash bin 20 for the purpose of responding to an entry of metal objects (best shown in FIG. 2). One example of such metallic objects may be ferrous or non-ferrous metallic silverware. In this regard, the metal detector 10 may be strategically positioned at any location of the trash bin 20. However, positioning the metal detector 10 to the inside surface 29 of the trash bin's cover 22, or any of the locations near a trash-receiving opening, may be optimal to serve the purpose of the present invention.

Figure 2:
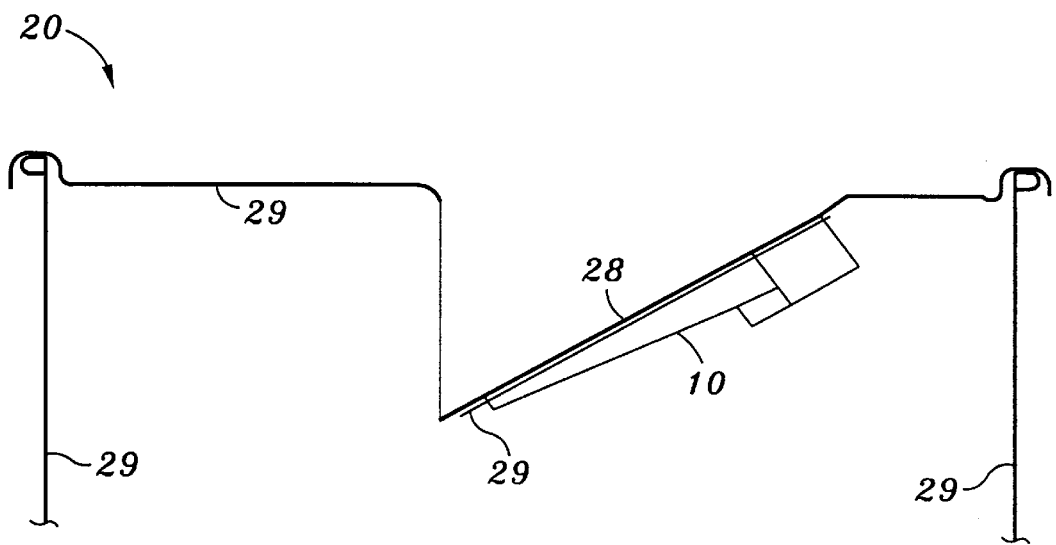
FIG. 2 is a side view of a trash bin positioning the metal detector of FIG. 1 underneath its chute.

Referring more particularly to FIGS. 1 and 2, the metal detector 10 may be formed to have a variety of shapes, configurations, geometries and textures. The metal detector 10 may be fabricated from any material such as metal, plastic, wood, hard rubber, or the like. Moreover, the metal detector 10 may be engaged to the trash bin 20 in any conventional or creative manner. Such methods of engagement may include, but is not limited to, ultrasonic welding, taping, fastening, or adhesive applications. Furthermore, the cover 22 may form a chute 28 in which the metal detector 10 may engage itself to the inside surface 29 (as shown in FIG. 2).

As the metal detector 10 may take the form of any general desired shape, it is understood that the metal detector 10 as depicted is symbolic in nature. It is submitted that any shape that will serve the purpose of the present invention, as will be described immediately below, will be sufficient. However, the metal detector 10, as depicted, has a generally rectangular shape.

The metal detector 10 further comprises a battery compartment 30. The metal detector 10 is activated by removing the cover to the battery compartment 30 and installing batteries therein (e.g., four standard alkaline "D" cell batteries). Thereafter, the cover is simply put back on and the metal detector 10 is ready for use. The metal detector 10 may be adapted to provide a visual or sound notification to the user when the batteries are no longer operative to supply the requisite power thereto. As will be more described below, subsequent to the placement of batteries, the user may be free of any other need to adjust or control the metal detector 10 for its intended purpose of detecting metallic objects.

After being engaged to the trash bin 20, the metal detector 10 is operative to alert the entrance of the metallic objects into the trash bin 20. The metallic objects may enter the trash bin 20 via a chute thereof, and are frequently intermingled with excess food fragments when progressing therethrough. By the nature of its design, the metal detector 10 operates to alert the user only in the presence of metallic objects within its predetermined proximity. It may be appreciated by those of ordinary skill in the art that the metal detector 10 may alert the user via sound or visual means. In addition, a remote door-chime sounder may be optionally used for the purpose of generating sound. The door-chime sounder triggers a tone by transmitting a radio frequency pulse of the appropriate characteristics. Such sounder may be useful when ambient noise is high and the tone emitted by the metal detector 10 itself is muffled by the trash bin 20 contents.

Furthermore, the metal detector 10 of the present invention is designed to automatically compensate for any stationary metallic objects within its proximity. The metal detector 10 may only be triggered to alert its user when the metallic objects are introduced into its predetermined proximity. Simply put, movement of metallic objects are needed to trigger an alerting response. As such, this automatic compensation feature of the present metal detector 10 allows it to be used with a metal trash bin, for example.

Figure 3:
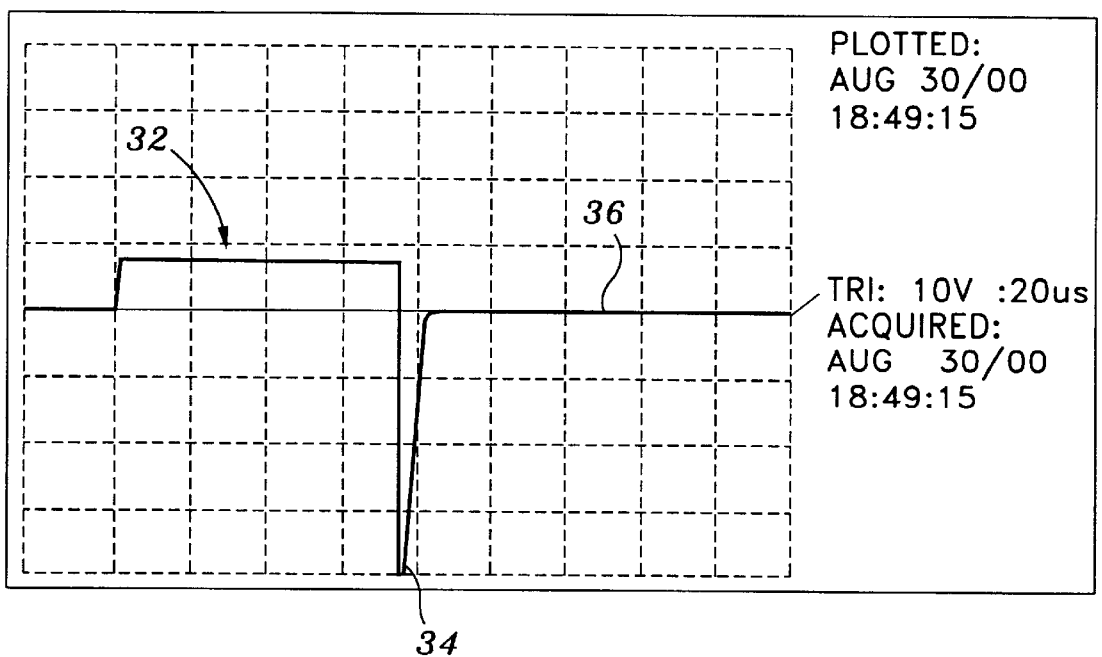
FIG. 3 is a graph illustrating in a wave form a voltage applied across a search coil of the metal detector shown in FIG. 1.
Figure 4A:
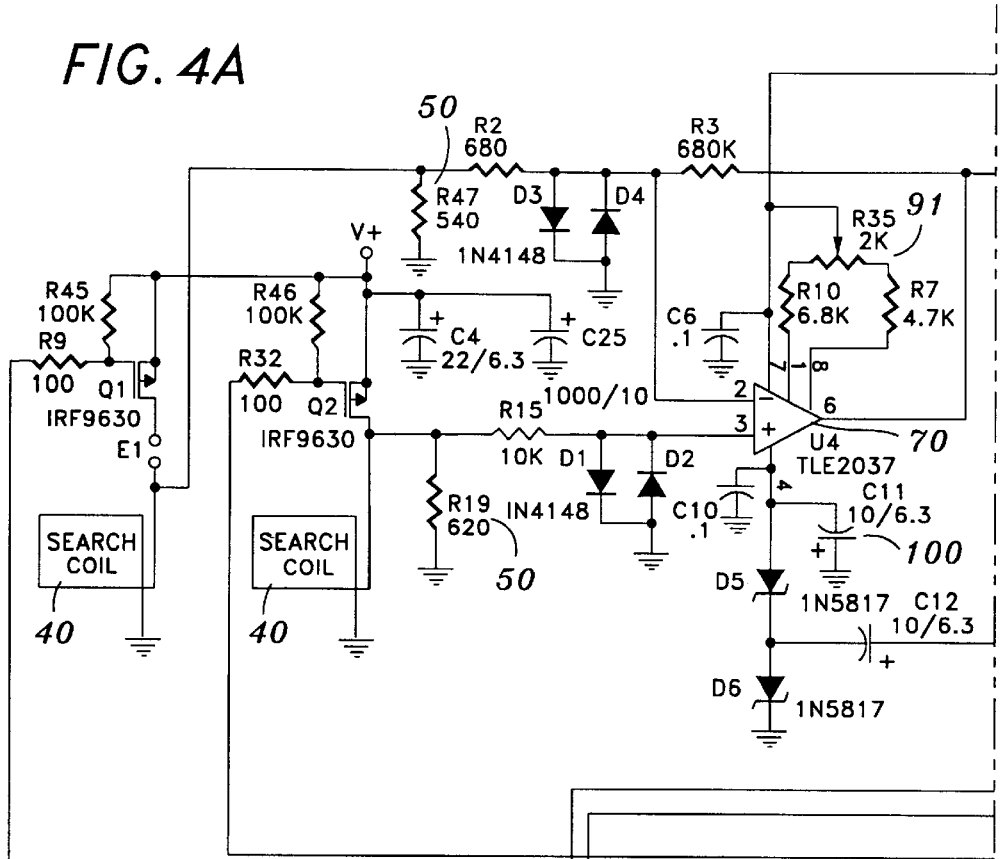
FIG. 4 is a schematic view of various internal components of the metal detector shown in FIG. 1 and further illustrating their positional and operational relationships with each other.
Figure 4:
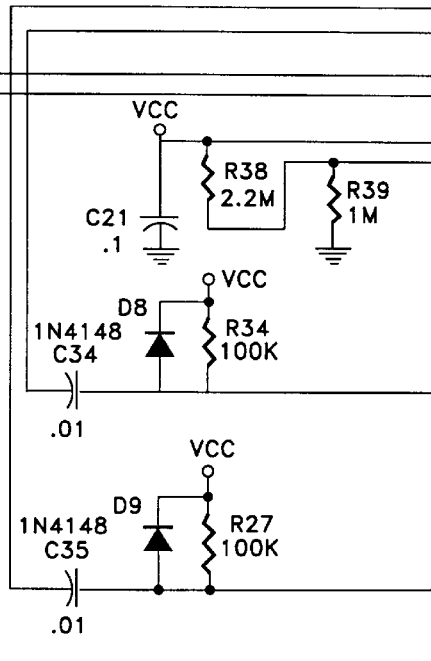
Figure 4B:
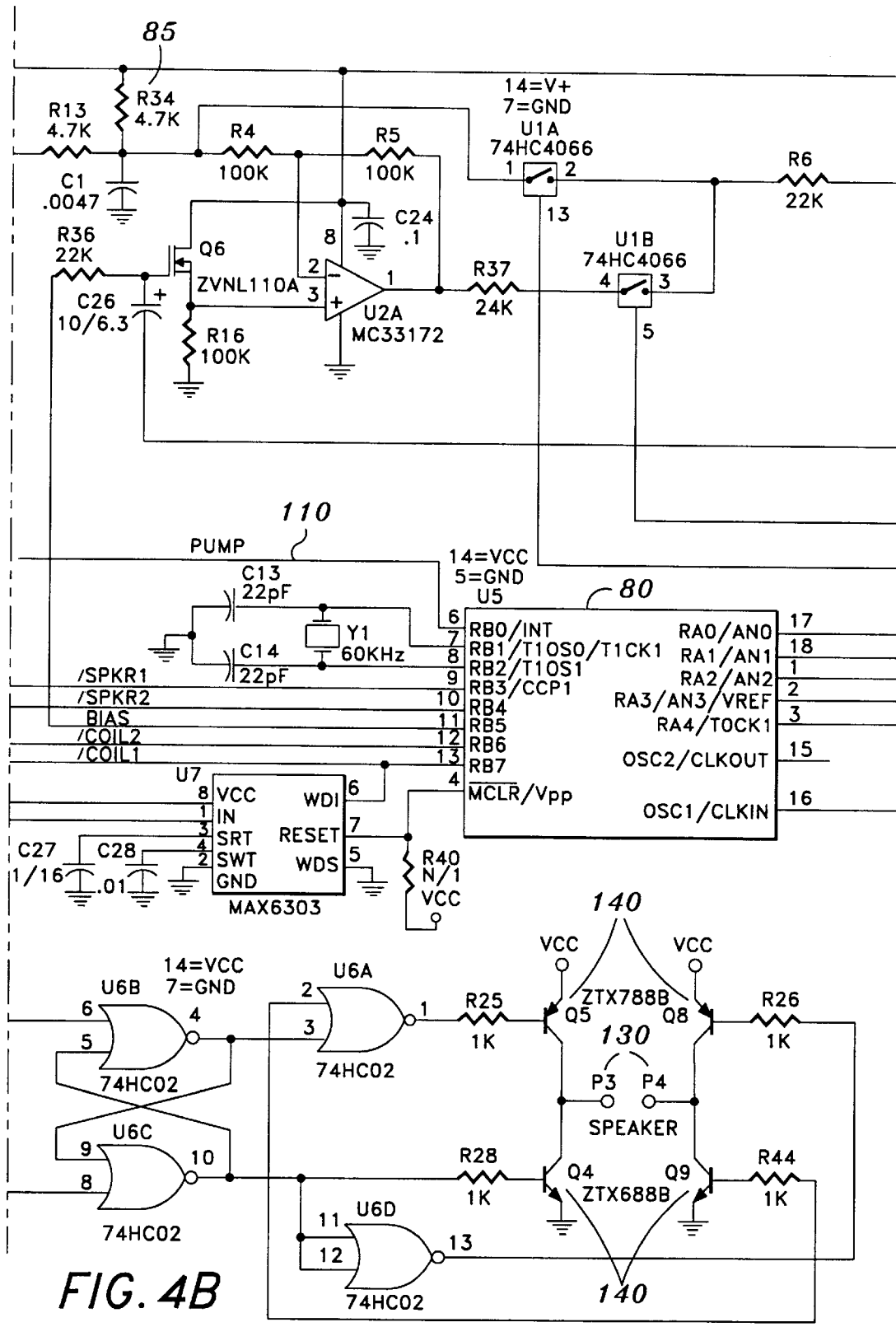

Referring now to FIGS. 3 and 4, the metal detector 10 is preferred to be in a "ready" mode for operation at all times that it is activated. Due to such continuing readiness, the metal detector 10 of the present invention eliminates the need for a switch or the like to activate and/or deactivate itself. Moreover, not only is there any need for such on/off switch, there is also no further need for any of the other controls, such as sensitivity or balance adjustment controls. As such, the metal detector 10 of the present invention needs to have an extremely low power consumption rate in order to preserve a reasonable battery life in view of its continuing readiness nature.

The metal detector 10 further comprises two search coils 40. The search coils 40 are receptive of pulses generated by the metal detector 10. It is contemplated by those of ordinary skill in the art that such pulses may be generated via conventional pulse generators. Incorporated herein by reference the issued U.S. Pat. No. 5,414,411 filed on Jun. 21, 1993, entitled "PULSE INDUCTION METAL DETECTOR," one of such pulse generators is disclosed therein. In short, a pulse generator of the metal detector 10 may be operative to generate and deliver short, high-current pulses into the search coils 40.

When the pulse ends, the already delivered current in the search coil 40 may be cut off in an abrupt manner. Such phenomena tends to cause a sudden collapse in the magnetic field, which may induce eddy currents into the metallic objects disposed in the predetermined proximity as a response. The induced eddy currents may decay correspondingly with the decay of the magnetic field to thereby effect a small voltage into the search coils 40. The voltage in the search coils 40 may be in the order of microvolts that may further be detected by appropriate circuitry.

More specifically, FIG. 3 exemplifies in a wave form the presence of a voltage generated by the batteries. The battery voltage 32 may be applied across the search coils 40. The portrayal of the voltage 32 waveform is just one example depicted for illustration purposes, and the present invention should not be only associated therewith. However, the battery voltage 32 of FIG. 3, which is approximately 6 volts, may be applied to the search coils 40 for about 20 microseconds. During the 20 microsecond time period, the delivered current in the search coils 40 may increase according to the equation:

$$I=vt/L \qquad (1)$$

where I is representative of the current, v is the applied voltage, t is time, and L is the coil inductance. At the end of the 20 microsecond time period, the current may be rapidly cut off which may in turn cause a large inductive voltage spike 34 in the opposite polarity. Such voltage spike 34 may even exceed 100 volts by the sudden cut off of the current at the end of the time period.

In particular, the end of the voltage spike 34, namely, its "tail" 36, may contain information regarding the metallic objects situated within the predetermined proximity in the form of microvolt-level signals. As apparent in FIG. 3, the voltage spike 34 may appear to decay to zero within about 10 microseconds of the pulse, or current, cut-off. Moreover, after the occurrence of the voltage spike 34, the tail 36 of the voltage spike 34 may flow in a continuous uniform manner in the approximate range of 20 to 100 microseconds, in which an amplification by a factor of 1,000 or more may be necessary to visualize the received signals. Such continuous uniformity of the tail 36 after its spike 34 may be effectuated by the nearby eddy currents.

Figure 6:
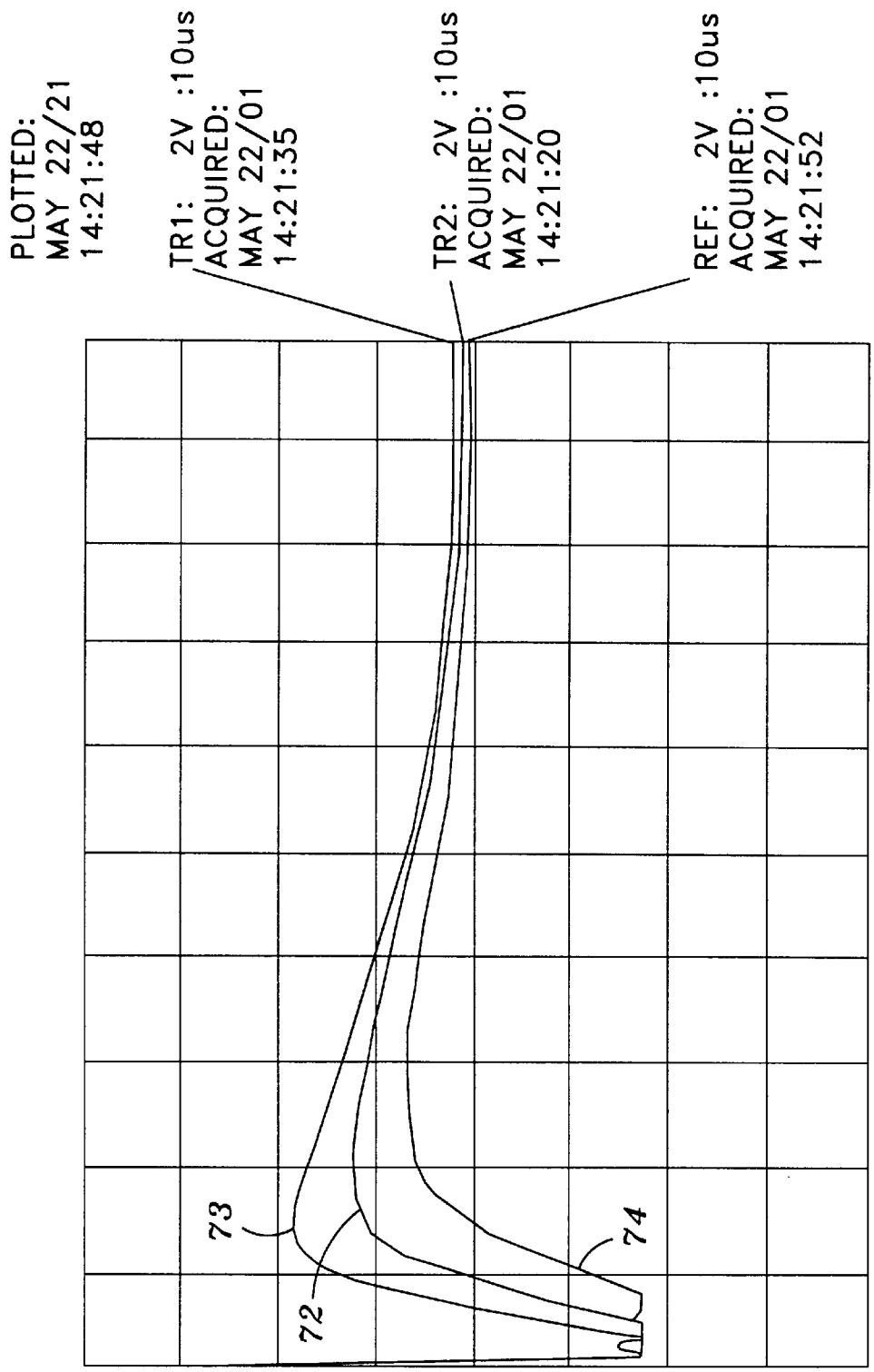
FIG. 6 is a graph illustrating a first signal that is representative of non-detection of metallic objects, further illustrating second and third signals that are representative of detection of metallic objects.

Referring now to FIG. 6, during the 20 to 100 microseconds after the voltage spike 34, a first sampling 46 of the amplified signals 72, 74 may take place. Thereafter, a second sampling 48 of the amplified signal 74 may occur subsequent to the 100 microseconds where the tail 36 may tend to decay away completely. The first and the second sampling 46, 48 of the amplified signals 72, 74 may be captured in order to be amplified differentially. Such differentation may mitigate, or even eliminate, offsets and low-frequency noise. However, it should be noted that filtering via a low-pass filter 85 occurs earlier in the signal path before the first and the second sampling 46, 48. Additionally, when the resulting signal is formed from the differentiation of the first and the second sampling 46, 48, a differential integrator circuit 120 inherently provides another stage of filtering via the low-pass filter 85 to further mitigate, or eliminate, high-frequency noise. The filtered resulting signal may be utilized to reflect a visual or audio type of indication, such as via deflecting a needle on a measurable meter or, alternatively, create an audible tone of some sort, as will be more explained below.

Figure 5:
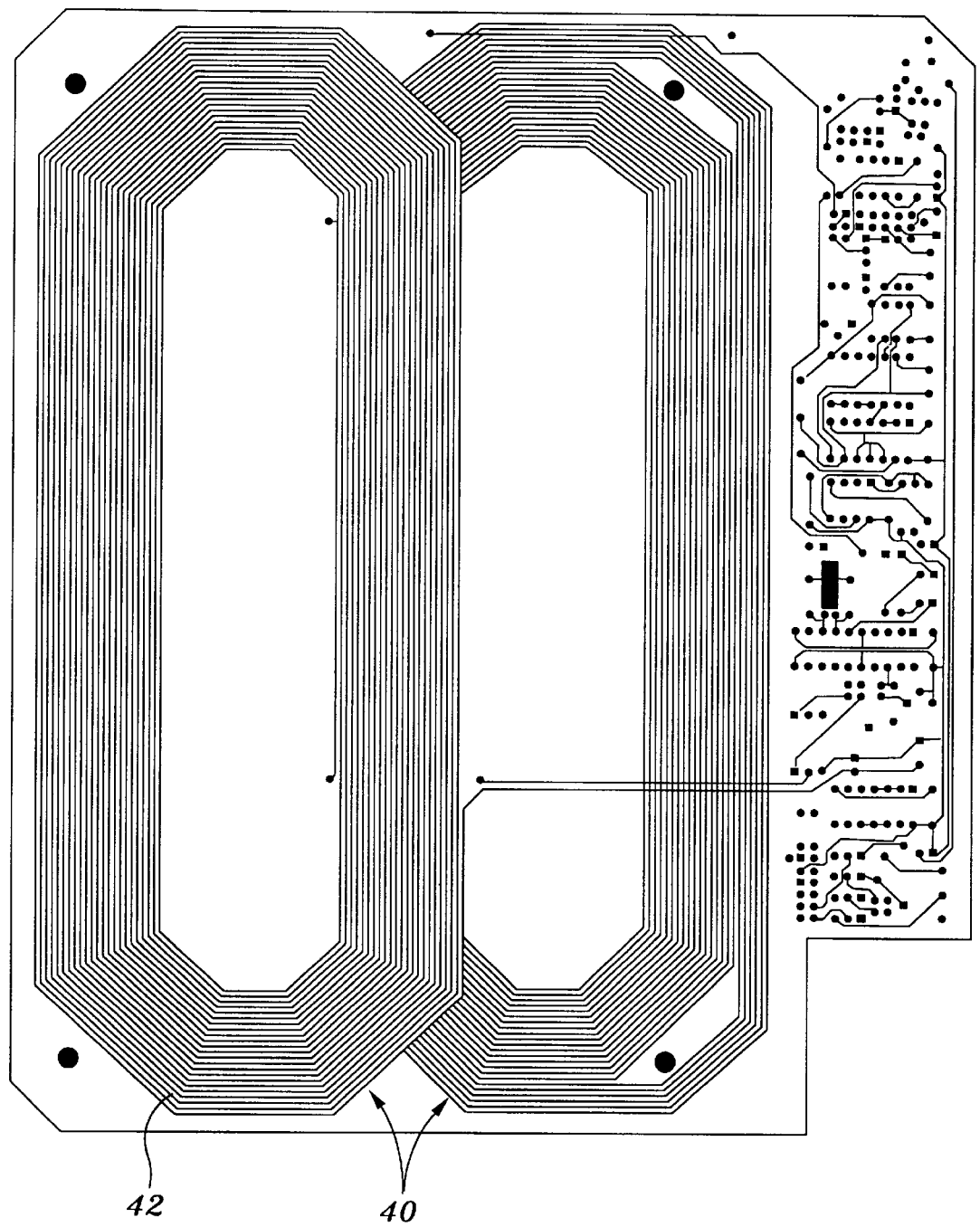
FIG. 5 is a top view of a circuit board with the search coil of FIG. 3 positioned thereon.

Referring now to FIGS. 4 and 5, the magnetic field generated via the search coils 40 as described above may be proportional to the current delivered to the search coils 40 and the number of turns 42 thereof. The maximum size of the search coils 40 may be dictated by available space. Moreover, the number of turns 42 in the search coils 40 is not a critical factor in the ultimate signal-to-noise performance of the present metal detector 10. Hence, the number of turns 42 can be chosen to optimize the tradeoff between the secondary parameters of the search coils 40 that are important in its performance and an inductance value that is convenient to work with in terms of desired pulse duration and peak current levels for the particular implementation.

Another design attribute of the search coils 40 is the cross-sectional area of the conductor used to implement it. This affects a secondary parameter of the search coils 40, namely, its resistance. The cross-sectional profile in conjunction with the spacing between conductors determines a third parameter, namely, the inter-winding capacitance. In an empirical testing it was found that the resistance of the search coils 40 was important only with respect to it limiting the maximum amount of current that could be driven into the coils 40 for a given available drive voltage. It was not a factor in the pulse induction detection phase at all. Of more importance was found to be the coil capacitance.

In the pulse-induction technique, sharp turn-off of the coil current at the end of the drive pulse is critical. This turn-off must be as rapid as possible to prevent the desired magnetic "echo" signal in the tail of the pulse from being swamped out.

Common practice in the design of metal detectors 10 is to employ damping resistors 50 directly across the search coils 40. This has the effect of controlling the decay time of the current pulse according to:

$$\tau = L/R \qquad (2)$$

where τ is the time constant, L is the inductance, and R is the resistance. From this equation it can be seen that the larger the resistance, the faster the decay. This equation shows that it is also desirable to minimize L to minimize decay time. L must be large enough to prevent the peak current (per equation 1) from exceeding the capabilities of the drive circuit.

The limiting factor for R is the capacitance of the coil 40. At some sufficiently large value of R, it ceases to be the controlling factor controlling the decay of the current pulse. Further increases in R do not further reduce the decay time because parasitic capacitances in the coils 40 provide a lower impedance path for the decay current than the damping resistors 50. When this happens, the decay tail overshoots and rings rather than smoothly decaying to zero. In other words, LC resonant effects start to appear and the circuit is said to be under damped.

To reduce this effect, the parasitic capacitance of the coils 40 must be minimized. The combination of inductance and capacitance in the coils 40 result in a self resonance frequency for those coils. This number is one figure of merit commonly used to specify inductors. Another figure of merit is Q factor, which is the ratio of inductance to resistance in the coil 40 at a particular frequency. In empirical testing it was found that a self-resonance frequency in the search coils 40 below about 100 KHz to 200 KHz started to reduce overall performance in this application.

As inherently disclosed above, the low capacitance and the increase in the damping resistor 50 to maintain a certain level of damping may be imperative in accomplishing a preferred manner of performance from the circuit. Specifically, further increases in the damping resistors 50, to the point where the circuit was significantly under damped, may further result in increase in performance.

The metal detector 10 also comprises a front-end amplifier circuit 70. As briefly discussed above, the front-end amplifier circuit 70 may function to amplify the received signals from the search coils 40. Thus, it may be important that the front-end amplifier circuit 70 be as sensitive as possible in order to minimize power consumption.

More specifically, the received signal has to exceed the noise level by a certain ratio to be consistently detected. Logically flowing from this concept, the lower the noise level gets, the lower the signal that may be detected. Thus, the lower the signal that is required, the less the energy it takes to generate such signal.

It may be preferable for the metal detector 10 to have the front-end amplifier circuit 70 in an inoperative mode, or "sleeping mode," except when needed to process a pulse in order to further save power consumption that results therefrom. In other words, the functions of the front-end amplifier circuit 70 may be called upon when needed to amplify the received signals 72, 73, 74, which typically may last in the approximate range of few hundred microseconds.

The pulse rate generated by the metal detector 10 of the present invention may be lowered to a specified frequency. In such occurrence, it may be realized by those of ordinary skill in the art that one way to control the pulse rate may be by a crystal. The frequency that results is generally about 120 Hz, or 100 Hz in countries with 50 Hz line power. By doing so, a cancellation of interference from the magnetic fields emanating from the power lines may result.

There is further provided a microcontroller 80 in the present invention. By using the microcontroller 80, several discrete circuits utilized to generate timing and control signals, to process the analog magnetic signal and to generate audio tones may be consolidated into one device. The microcontroller 80, therefore, may simplify the hardware circuitry and may even help reduce the cost of the design. Furthermore, the microcontroller 80 may aid in allowing algorithms to be implemented for self-adjustment purposes to thereby mitigate, or even eliminate, the need for user controls.

One type of microcontroller 80 that may be utilized with the present invention is a Microchip PIC16C712. However, it is contemplated by those of ordinary skill in the art that the Microchip PIC16C712 is just one component among many, and there are other manufactured components that may be used for the similar purpose.

There is further a need to support for a low frequency and a low power crystal oscillator independent of the main CPU time base. For instance, a 60 KHz crystal frequency may be divided by 500 using a dedicated counter internal to the chip to generate the 120 Hz pulse frequency as stated above. Or, in the alternative, it may be divided by 600 to generate the 100 Hz, as also stated above. Moreover, the CPU may also have a feature to put itself in an inoperative mode, or a "standby" mode, until a specific event occurs to thereby be in an operative mode once again. In short, the CPU may become operative when necessary by the low frequency oscillator to complete the task at hand, and may become inoperative thereafter. Such feature of the CPU may contribute to minimize the overall power consumption of the present invention.

Because the pulse-induction design of the metal detector 10 may be a combination of low speed, 120 Hz for example, and high speed activities such as a microsecond pulse width, such arranged combination may be ideal for generating the necessary timing with minimal power consumption necessary. In particular, the CPU may only be in the operative mode about 5% of the time such that its nominal 1 mA current draw at 4 MHz may reduce to an average of about 50 μA.

In addition, the precision of the low speed timing may be more critical than the high speed timing. As such, a low cost RC relaxation oscillator, which is an another feature offered by the microcontroller 80, may be introduced into the present invention as the main, high speed timebase of the CPU. The introduction of the RC relaxation oscillator may provide additional power savings because its first cycle may be good as any other cycles. In contrast, a crystal oscillator may require milliseconds to start up and stabilize, in which a long start up time may be detrimental to the advantages offered by the present invention.

The metal detector 10 of the present invention may further comprise a trimpot 90. The trimpot 90 may permit a onetime factory adjustment of the main CPU time base in order to compensate device variations and component tolerances. However, such adjustment is not believed to be critical in the overall scheme of things. Primarily, the adjustment via the trimpot 90 may bring the 20% to 30% device variation down to about a 2% to 3% range. In addition, there is further provided an offset trim adjustment 91.

Moreover, the microcontroller 80 may additionally control the power to the entire analog signal path. For instance, the microcontroller 80 may control the power to the front-end amplifier circuit 70 and further used to help generate its negative power supply. However, there may be a tradeoff in analog amplifier design between low power consumption and inherent noise. The low power devices may have the tendency to be noisier, whereas the low noise devices may have more power consumption. The front-end amplifier circuit 70 may be chosen for its low noise characteristics and low input offset. But, the front-end amplifier circuit 70 may have a fairly high current draw from its power supply. To mitigate the impact from such effect, the front-end amplifier circuit 70 may be left in an inoperative state, or "sleeping" mode, and not turned on by the CPU until a few microseconds before the end of the drive pulse. Thereafter, the front-end amplifier circuit 70 may be turned off into an inoperative state after the last sampling as described above is taken. By doing so, the 4 mA to 5 mA current draw of the front-end amplifier circuit 70 may be reduced to 5% duty cycle for an average current draw of 0.2 mA to 0.25 mA, which is believed to be within the allowed range.

The high current drive capability of the microcontroller 80 may be utilized to implement a simple charge pump circuit 110 in order to generate the required negative supply. Such generation may be in response to the need for the negative supply by the front-end amplifier circuit 70. More particularly, the microcontroller 80 may run the charge pump circuit 110 for a few cycles prior to each induction pulse cycle to charge up the negative supply holding capacitor 100. The induction pulse cycle may then be performed as the negative supply holding capacitor 100 provides the negative supply to the front-end amplifier circuit 70. However, it may be important to note that no charge pump cycles are carried out during this time to minimize noise.

However, the front-end amplifier circuit 70 may not draw significant current from its negative supply when its positive supply is turned off by the CPU. Therefore, the capacitor 100 may remain charged at the end of the induction pulse cycle until the start of the next one with very little decay. Thus, such characteristic may provide an additional benefit of mitigating the amount of power necessary in order to charge up the capacitor 100 in anticipation of the new induction pulse cycle.

Referring now to FIG. 6 in view of FIG. 3, the front-end amplifier circuit 70 may output a first signal 72 that may be representative of an indication of no presence of the metallic objects overlaid with second and third signals 73, 74 that may be representative of the presence of the metallic objects. More specifically, the second signal 73 is representative of indication of presence of the metallic objects in proximity to one of the search coils 40, whereas the third signal is representative of the same in proximity to the other search coil 40. At the end of the drive pulse, the signals 72, 73, 74 may lay on the negative rail until the negative-going induct spike decays sufficiently. Unlike the depictions made in FIG. 2, the amplified version of the inductive voltage spike 34 in FIG. 5 may take more than 100 microseconds to decay away completely when there are no metallic objects within the predetermined proximity. When there are metallic objects, it may take a longer duration in time.

The "tail" 75 of the signal 74 may extend by the presence of the metallic objects in the vicinity of the search coil 40. Such "tail" 75 may be subjected to the first sampling 46 process due to a high degree of variability. As mentioned above, it may be preferable, although not needed, to filter the signal via the low pass filter 85 before being sampled, as in the U2A stage. More particularly, a 50-microsecond first sampling 46 may be taken starting 5 to 30 microseconds after the falling edge of the drive pulse such as in U1B stage. Thereafter, the microcontroller 80 waits for about 100 microseconds. The microcontroller 80 may then do a second 50-microsecond sampling 48 via U1A. Finally, the two sampling 46, 48 may be applied to complementary inputs of a differential integrator circuit 120, in which the microcontroller 80 may then measure the result outputted by the differential integrator circuit 120 using its internal analog to digital converter, or ADC.

Because of the above low-pass filtering inherent in the integrating process, there may be no need for U2's gain-bandwidth product to greatly exceed that of the filter it implements. Such makes it possible to use a low-speed but a low-power device. The current draw of the low-power device at 0.25 mA may be well within the allowable budget.

Furthermore, any signal with a frequency greater than the Nyquist frequency, namely, 60 Hz, may be aliased down to a lower frequency. For instance, a given signal at 110 Hz would add 10 Hz noise component to the desired signal. In contrast, a signal at 130 Hz would likewise be aliased down to 10 Hz. The predominate source of interference in this frequency range may be magnetic fields from power line frequency and its harmonics. By setting the sample rate to exactly twice the power line frequency, the even harmonics may be aliased to DC and the fundamental and odd harmonics result in a 60 Hz signal being passed to the integrator. Moreover, the 60 Hz interference may be attenuated in the microcontroller 80 using digital filtering techniques.

Figure 7:
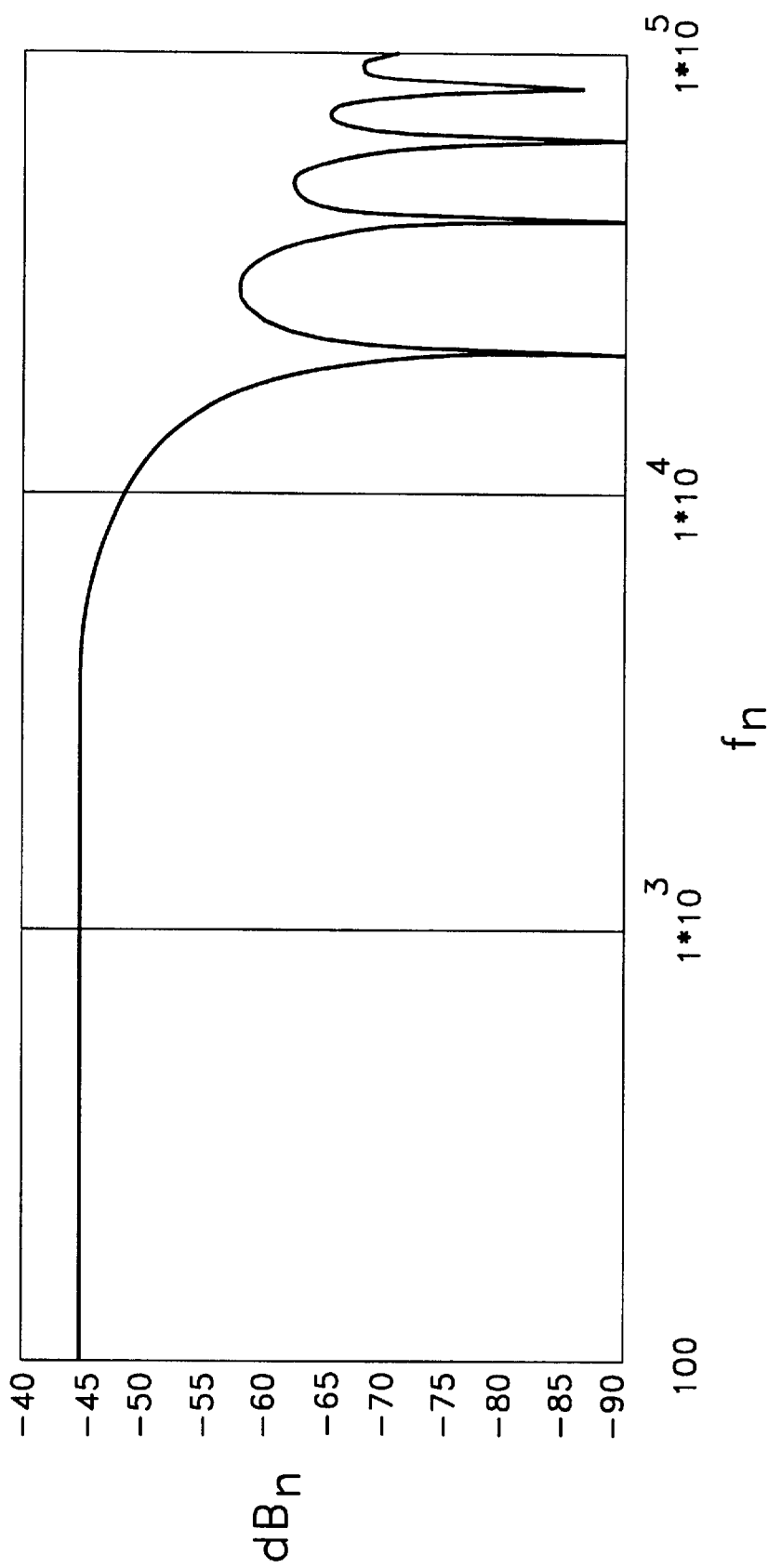
FIG. 7 is a graph illustrating a frequency response resulting from the sampling process.

Referring now to FIG. 7, the 50 microsecond pulses used for sampling the signal may cause aliasing in relatively higher frequencies. It is submitted that powerful AM radio station transmitters, for example, may cause interference at such frequency range. For such reasons, it may be advantageous to low-pass the signal before it is sampled. For instance, a single-pole low-pass with a corner frequency of approximately 15 KHz may be used, resulting in approximately 3.5 dB improvement in signal-to-noise ratio.

Figure 8:
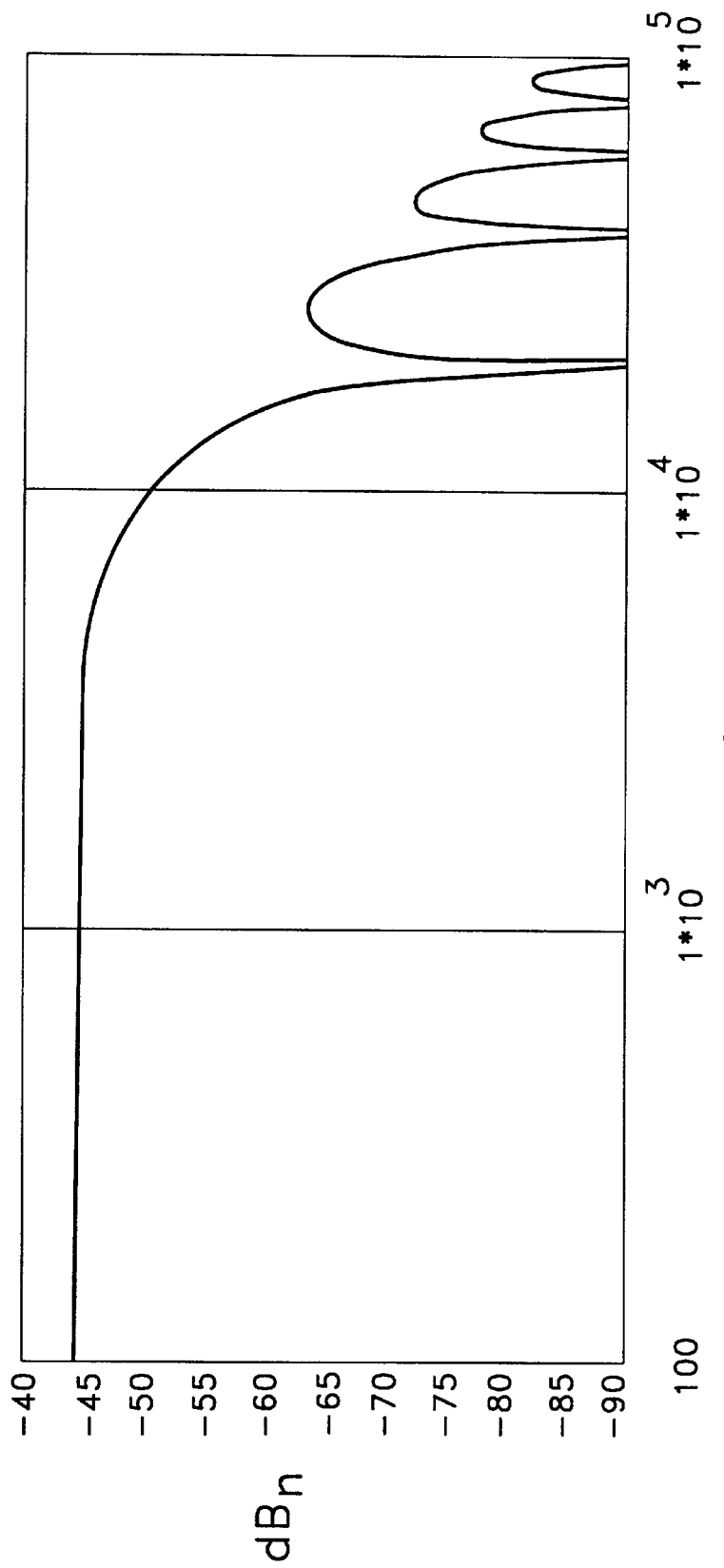
FIG. 8 is a graph illustrating a frequency resulting from the sampling process with a pre-filter.

Referring now to FIG. 8, the composite spectrum of the 50-microsecond sample with the 15 KHz pre-filter is portrayed. It may be significant to note therein that the peaks beyond 20 KHz may be reduced while frequencies below that, containing the signal information, are hardly touched. One of ordinary skill in the art may realize that more sophisticated filters with higher orders could be implemented, both before or after the sampling, to achieve higher performance. Moreover, the sampling circuit itself, instead of using simple on/off switches resulting in square-edged samples, may be modified to use a (sin X)/X or a Gaussain shaped sample pulse to produce the desired filtering effect and obviate the need for the pre-filter. In addition, digital filters may be implemented as opposed to analog filters. Simply out, a variety of conventional off-the-shelf components may be used with the present invention.

Referring now back to FIG. 4, the microcontroller 80, via the internal ADC, may sample the signal as it appears at the output of the integrator. Such sampling may be precisely synchronized to the generation and sampling of the induction pulse. This has the effect of aliasing the 120 Hz pulse rate down to DC where it cannot interfere with signal detection. Additionally, the integrator has higher gain, which has the effect of increasing ADC's resolution referred to the integrator's inputs. To compensate for the loss in dynamic range this produces, the microcontroller 80 can change the bias on the circuit by pumping charge into or out of C26 via the pin called "BIAS." This causes the operating range for the net signal at the input to the integrator to shift up or down. The microcontroller 80 always seeks to adjust it to maintain it in the middle of its operating range. As such, even though that range is much smaller because of the new circuit's higher gain, this adjustment capability makes it possible for the microcontroller to compensate any factors that may tend to throw it off. Moreover, "baseline" which consists of a heavily filtered version of the signal acquired by the ADC is realized in hardware and is represented by the bias level established on C26. The time constant of the software loop that adjusts the charge on C26 along with the value of R36 and C26 provide a time constant on the order of several seconds.

The microcontroller 80 may provide yet another function. Specifically, the microcontroller 80 may be configured to provide sound generation when the magnetic signal exceeds a pre-programmed threshold. The microcontroller 80 may generate a tone with a pitch that corresponds to the degree by which the signal exceeds the threshold. Even though the magnetic signal may go away rapidly, the tone may continue with a gradually decaying pitch until a certain frequency is reached, at which point the tone stops. Thus, a strong magnetic signal may produce a tone that starts at a higher pitch and lasts longer than a weak magnetic signal.

The microcontroller 80 may use the time between the induction pulses, namely, the time it normally spends in an inoperative mode, or "sleeping" mode, to generate the tone. It is understood that the generation of the tone may increase CPU power consumption because the CPU is typically in an operative mode, or "awake" mode, almost all of the time. Even so, this power consumption may be dwarfed by the power used to drive a speaker 130 so as to be an insignificant consideration. More specifically, the sounding of a tone is an occasional, anomalous event and should not be an overwhelming factor in determining the battery life relative to the continuous standby current drawing nature of the present invention.

Since no attempt may be made to interleave tone generation with the events during a pulse-induction cycle, the tone of the speaker 130 may be effectively interrupted 120 time per second. As mentioned, the tone generation may only occur when the CPU is not busy with the pulse-induction cycle. Such occurrence may add a very rough and annoying quality to the resulting tone, which may not be a bad effect given the purpose of the present invention.

In addition, the circuit for driving the speaker 130 may be a full H-bridge design. The four transistors 140 chosen for this design may be selected based on their high gain and high current handling capacity. U6 may be a safety circuit to guarantee that the transistors never turn on at the same time. Regardless of any transients or anomalies that may occur in the microcontroller 80, the full H-bridge may be protected. In practice, such a precaution has proven to be necessary, even though, in theory, the microcontroller 80 may be programmed to never drive the transistors 140 on at the same time.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A receptacle system for detecting at least one metallic object entering therein and alerting a user in response to the detection, the system comprising:
   a receptacle body forming an interior cavity;
   a cover engaged by the receptacle body, the cover defining an opening for providing access to the interior cavity; and
   a continuously-activated metal detector attached to the cover, the metal detector being operative to detect the at least one metallic object entering through the opening of the cover and to alert the user in response to the detection of the at least one metallic object, the metal detector including a pulse induction metal detector further operative to generate a series of pulse and comprising:
      at least one search coil for receiving the series of pulses and outputting a signal in response thereto;
      a low pass filter for receiving the signal from the search coil and mitigating outside interferences therefrom;
      a front-end amplifier circuit for amplifying the signal, the front-end amplifier circuit being in a sleep mode except when the signal is to be amplified; and
      a microcontroller for performing a first sampling upon the signal and a second sampling upon the signal subsequent to the first sampling, the microcontroller being operative to control the mode of the front-end amplifier circuit and to generate an alarm when a programmed threshold is exceeded.

2. The system of claim 1 wherein the cover has an inside surface for removably attaching the metal detector thereto.

3. The system of claim 1 wherein the at least one metallic object is a silverware.

4. The system of claim 1 wherein the at least one metallic object is fabricated from a ferrous material.

5. The system of claim 1 wherein the at least one metallic object is fabricated from a non-ferrous material.

6. The system of claim 1 wherein the metal detector comprises a battery compartment, the battery compartment sized and configured to receive at least one battery for generating power to the metal detector.

7. A metal detector operative to generate a series of pulses comprising:

a receptacle body forming an interior cavity;

a cover engaged by the receptacle body, the cover defining an opening for providing access to the interior cavity; and a pulse induction metal detector attached to the cover, the metal detector including a pulse induction metal detector operative to generate a series of pulses and comprising:

at least one search coil for receiving the series of pulses and outputting a signal in response thereto;

a front-end amplifier circuit for amplifying the signal; and a microcontroller for performing a first sampling and a second sampling upon the signal, the microcontroller being operative to generate an alarm when a programmed threshold is exceeded, wherein the microcontroller comprises a RC relaxation oscillator to regulate high-speed timing of the pulse induction metal detector and a crystal oscillator to regulate low-speed timing of the pulse induction metal detector.

8. The system of claim 7 wherein the metal detector comprises two search coils, each of the two search coils being operative to receive the series of pulses and respectively output the signal in response thereto.

9. The system of claim 7 wherein the series of pulses are communicated to the at least one search coil for approximately 20 microseconds.

10. The system of claim 9 wherein the series of pulses are terminated to induce a series of eddy currents into the at least one metallic object to determine the detection thereof.

11. The system of claim 10 wherein the search coil outputs the signal after the eddy currents are induced into the at least one metallic object such that the signal contains information obtained thereby as to the detection of the at least one metallic object.

12. The system of claim 7 wherein an entire analog circuit is operative only when amplifying the signal so as to mitigate power consumption.

13. The system of claim 7 wherein the front-end amplifier circuit is operative only when amplifying the signal so as to mitigate power consumption.

14. The system of claim 7 wherein the microcontroller is operative to alternate between operative and inoperative modes so as to mitigate power consumption.

15. The system of claim 7 wherein the first sampling and the second sampling are each conducted for approximately 50 microseconds.

16. The system of claim 7 wherein the pulse induction metal detector comprises a differential integrator circuit, the differential integrator circuit being operative to compare the first and second samplings to output a sampling result.

17. The system of claim 16 wherein the microcontroller comprises analog to digital converter for receiving the sampling result.

18. The system of claim 17 wherein the microcontroller is in communication with a speaker for generating the sound tone when the sampling result exceeds the programmed threshold.

19. The system of claim 18 further comprising a full H-bridge designed circuit for driving the speaker.

* * * * *